Aug. 16, 1966   W. G. TOLAND   3,266,180
LAND LEVELER
Filed May 21, 1962   5 Sheets-Sheet 1
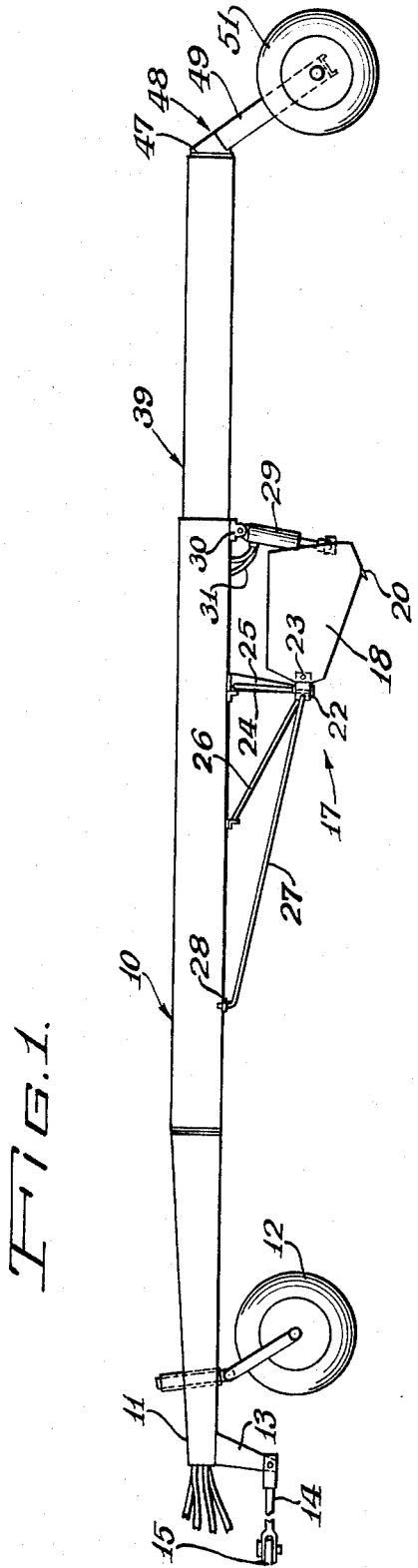
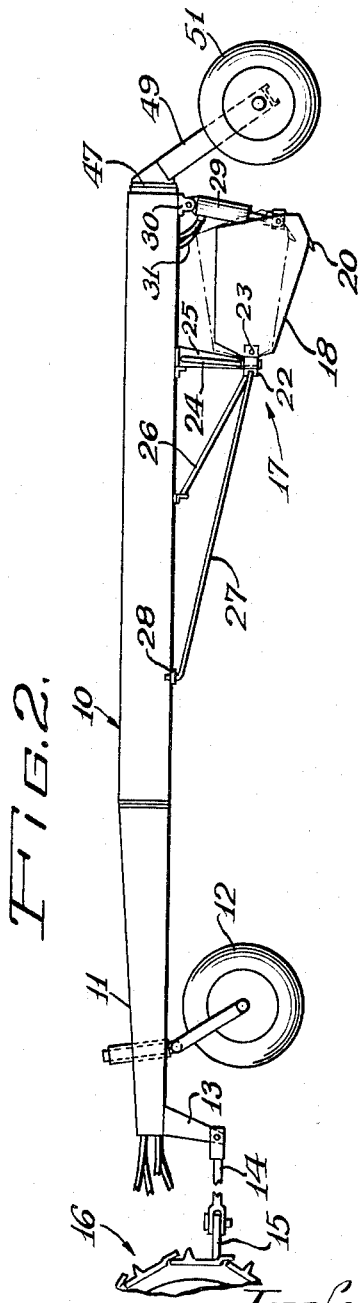
Inventor:
Wayne G. Toland
Paul O. Pippel
Atty.

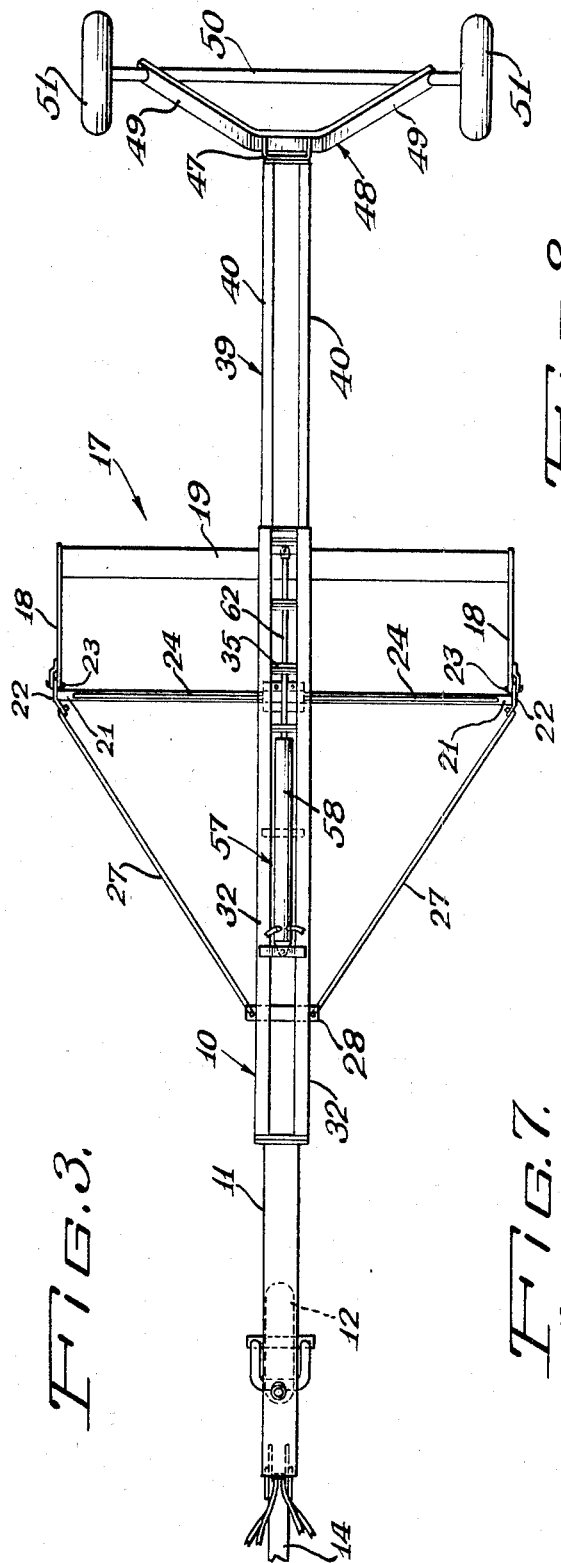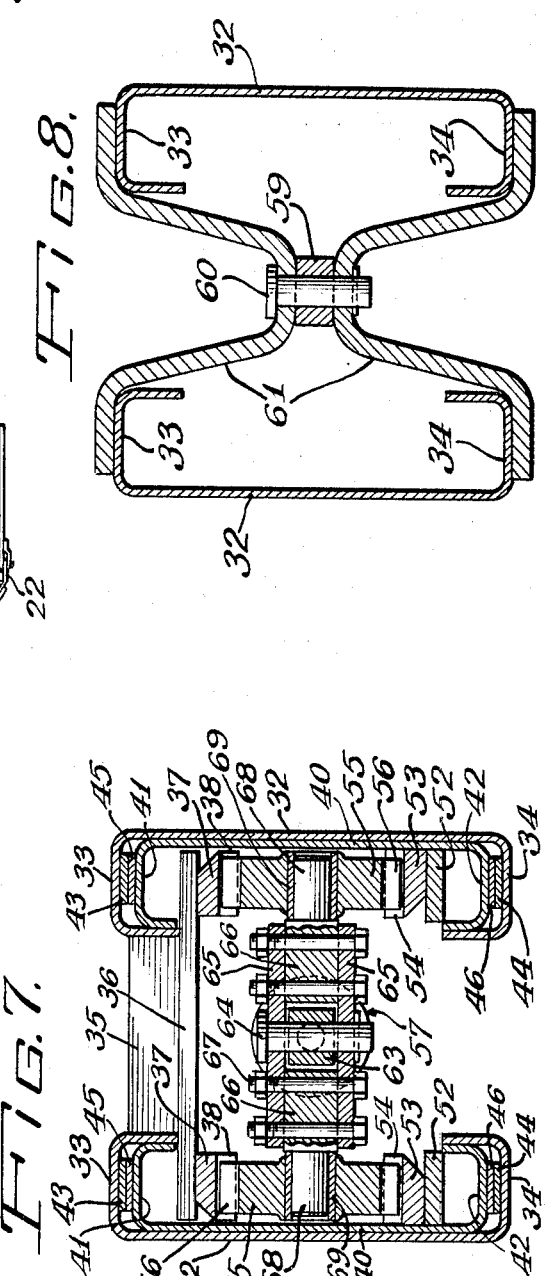

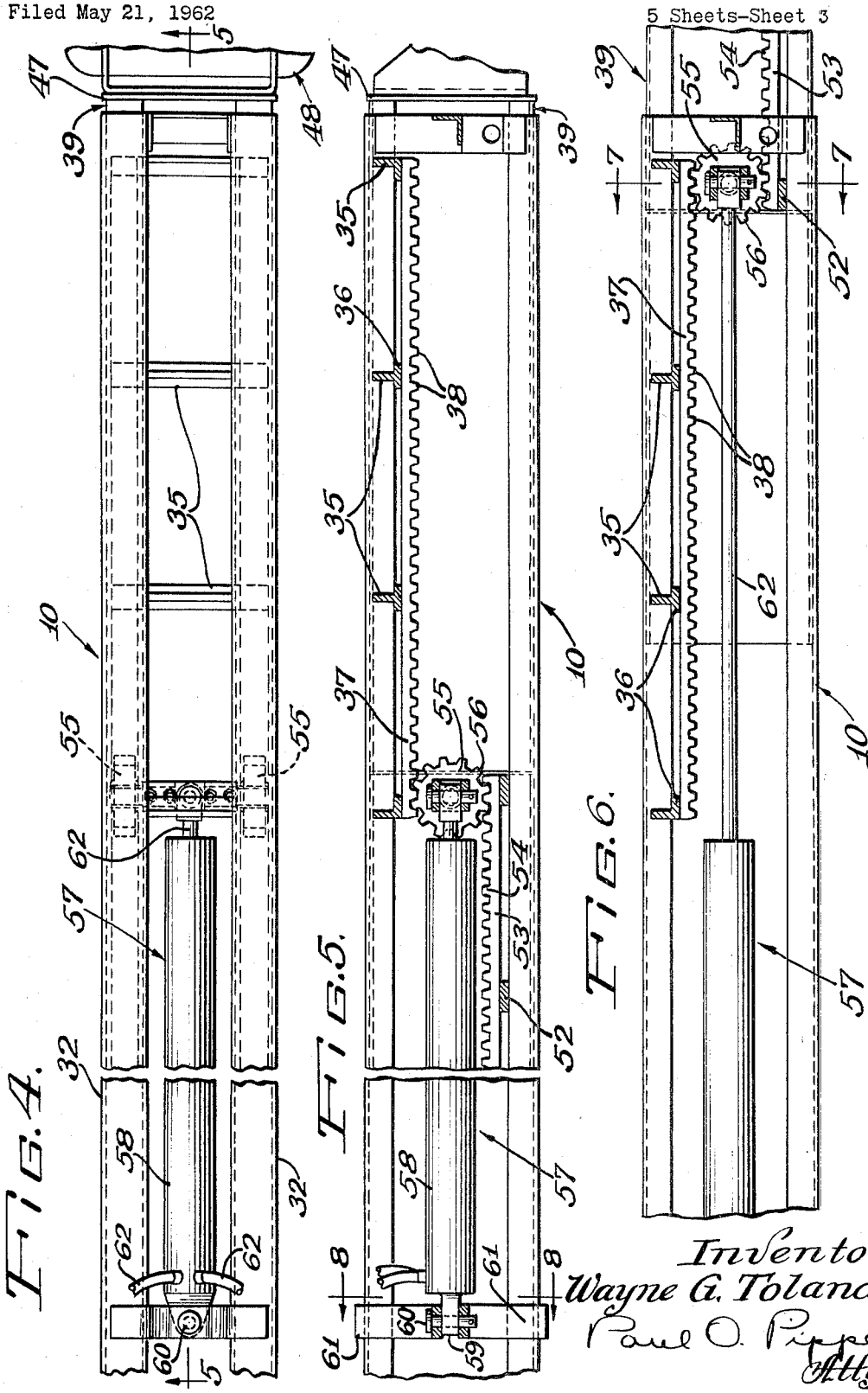

Aug. 16, 1966  W. G. TOLAND  3,266,180
LAND LEVELER
Filed May 21, 1962  5 Sheets-Sheet 4
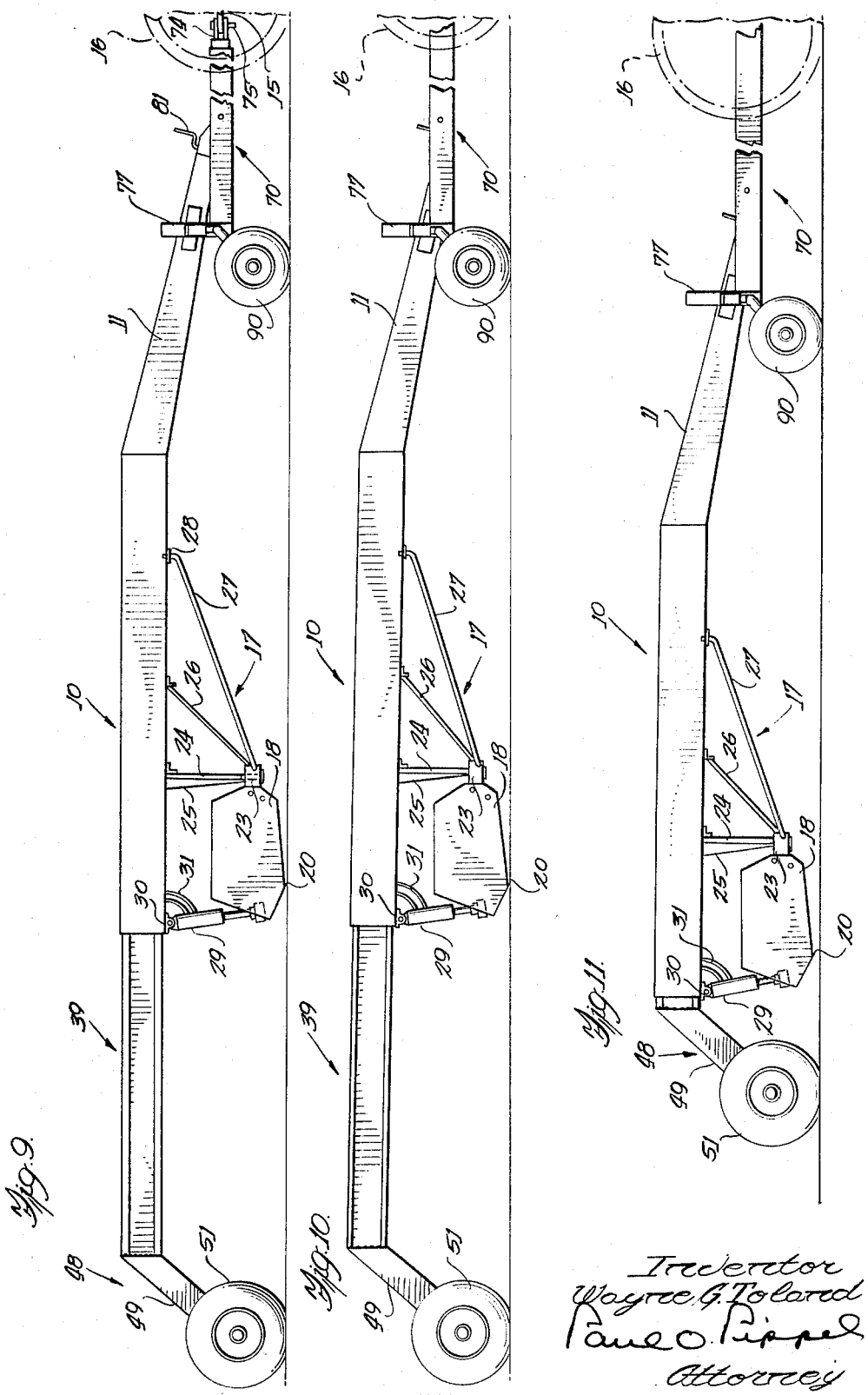

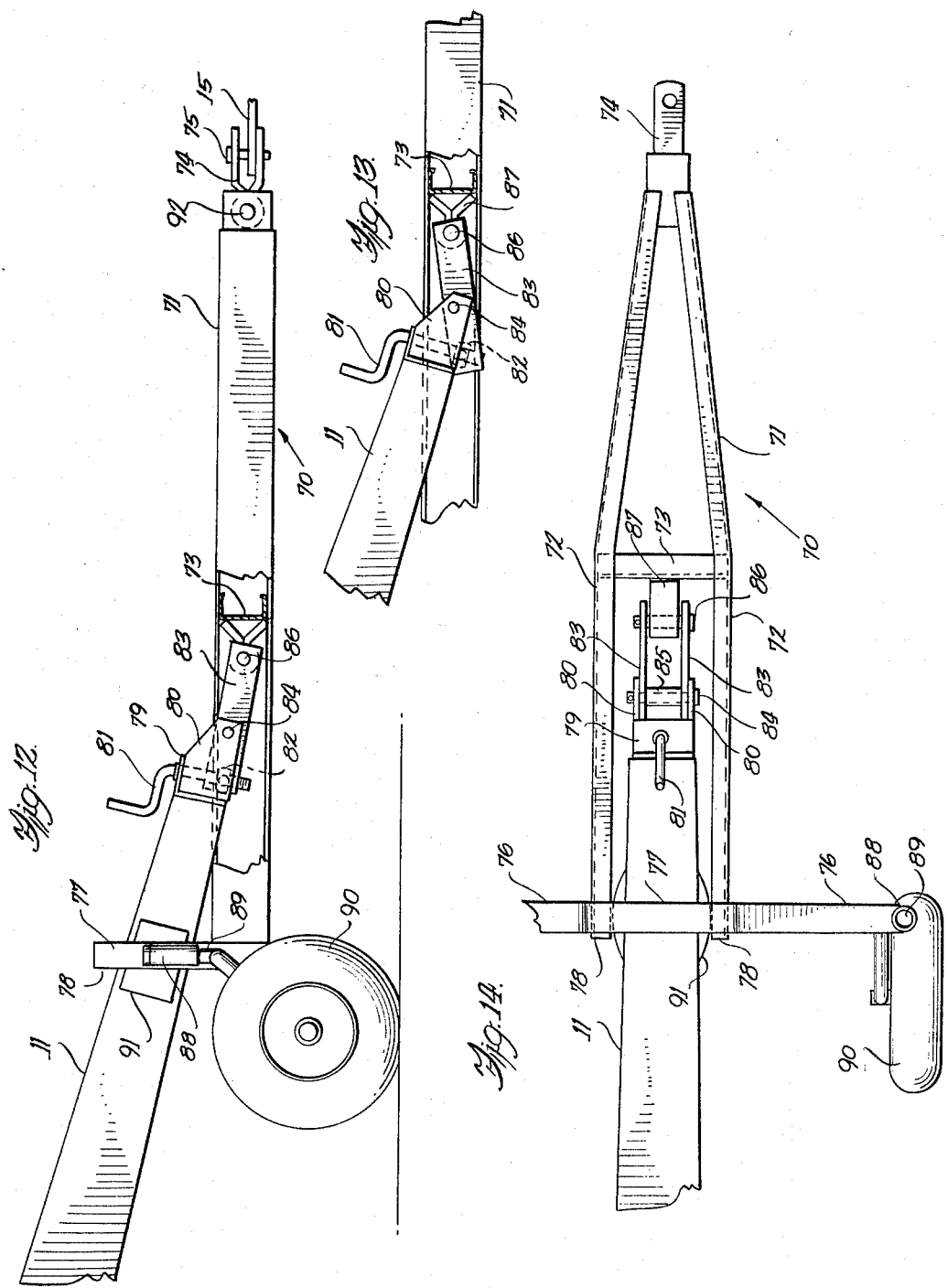

United States Patent Office 3,266,180
Patented August 16, 1966

3,266,180
LAND LEVELER
Wayne G. Toland, Stockton, Calif.; Lillian M. Toland, heir of said Wayne G. Toland, deceased, assignor to International Harvester Company
Filed May 21, 1962, Ser. No. 198,408
19 Claims. (Cl. 37—153)

This invention relates to earthworking implements and particularly to land planes or levelers, and is a continuation-in-part of U.S. application Serial No. 59,650 filed September 30, 1960, now abandoned.

Land planes are used to level rough ground for the growing of crops and the like, and also to maintain an even surface. These implements generally consist of a rather bulky and heavy mobile frame on which is mounted a leveling blade or bucket adapted to remove mounds and fill hollows in the ground. The conventional leveler is rigid and difficult to maneuver, particularly in turning, and it has been proposed to articulate the frame to allow the wheel supported tail section to swing to one side when the machine is to be turned and facilitates following the path of travel of the machine. The resulting machine was easier to maneuver but was relatively unstable requiring a support in the form of gauge wheels adjacent the bucket, in addition to the wheels on the tail section, to prevent the frame from becoming unbalanced and one end of the blade engaging the ground as the result of lateral swinging of the tail section when turning, and the present invention contemplates as its object the provision of a land leveling machine of novel construction having simple and efficient means for stabilizing the leveling blade as well as improving the operating characteristics of the machine.

Another object of the invention is the provision of an improved land leveling machine of the rigid type adapted to be propelled by a tractor wherein the frame is separated into a main blade-carrying section and a rear wheel-carrying section which telescopes into the blade-carrying section to bring the supporting wheels up closely behind the blade in turning and in transport.

Another object of the invention is the provision of an improved land leveling machine wherein the frame consists of telescoping parts adapted to bring the rear supporting wheels closer to the leveling blade when turning and wherein the telescoping is accomplished automatically by means deriving power from the tractor and under the control of the tractor operator.

Another object of the invention is the provision of a land plane or the like having telescoping front and rear frame sections wherein a hydraulic cylinder and piston unit mounted on the front or main section is connected to the rear wheel supporting section by means multiplying the action of the ram to cause the frame sections to telescope at a higher rate than the stroke of the ram piston.

In areas where land planes are generally used, it is often desirable to move large quantities of dirt into low spots. When this is done, it is desirable that the dirt be spread evenly over the entire length of the dumping area, and where conventional scrapers are used for this purpose, the dirt is spread evenly by gradually raising the scraper blade or bucket as the machine moves forward. This practice is called "feathering out." The operation of gradually raising the blade requires considerable skill on the part of a machine operator, and generally necessitates more than one pass over the area.

Therefore, a further object of this invention is the provision of an earth scraping and moving machine of novel construction designed to simplify the operation of filling depressed areas and spreading the dirt evenly.

Another object of the invention is the provision, in an earth working machine of the type having a scraper blade adapted to move dirt from one area to another to fill holes and the like, of novel adjustable hitch means for attaching implements to a tractive vehicle, and cooperative with the blade for evenly spreading or "feathering out" the dirt in the area treated.

A still further object of the invention is the provision, in a land leveler or the like having an elongated body on which is mounted a scraper blade and a wheeled tail section supporting the rear end of the frame, and wherein the tail section telescopes from a normal operating position with the wheels substantially rearwardly of the blade to a position closely adjacent to the blade, the combination of hitch means cooperative with said tail section to gradually raise the blade during telescoping of the tail section.

Other objects and advantages of the invention will become clear from the following detailed description when read in conjunction with the accompanying drawings, wherein:

FIGURE 1 is a view in side elevation of a land plane incorporating the features of this invention in the operating or extended position thereof;

FIGURE 2 is a view similar to FIGURE 1 showing a land plane in its closed or fully telescoped position and attached to the drawbar of a tractor;

FIGURE 3 is a plan view of the structure shown in FIGURE 1;

FIGURE 4 is an enlarged plan view of a portion of the land plane containing the operating mechanism;

FIGURE 5 is a section taken on the line 5—5 of FIGURE 4, with the parts of the frame shown in retracted position;

FIGURE 6 is a view similar to FIGURE 5 showing the position of the parts in extended position;

FIGURE 7 is an enlarged section taken on the line 7—7 of FIGURE 6;

FIGURE 8 is an enlarged section taken on the line 8—8 of FIGURE 5;

FIGURE 9 is a view in side elevation of a modified hitch structure for the land plane of this invention with the parts in position for normal operation as a land plane or leveler;

FIGURE 10 is a view similar to FIGURE 1 with the front end of the main frame lowered with respect to the hitch structure and to the ground in order to tilt the entire supporting frame forwardly and downwardly;

FIGURE 11 is a view similar to FIGURE 2 but illustrating the fully telescoped or closed position of the implement frame;

FIGURE 12 is an enlarged detail of the modified hitch structure of the implement as shown in FIGURE 9, with parts broken away, and partly in section;

FIGURE 13 is an enlarged detail, partly in section and with parts broken away, of the hitch structure in the position of FIGURE 10, and FIGURE 14 is a plan view of the structure shown in FIGURE 12.

The land plane shown in the drawings comprises a main truss frame or beam 10 with a hitch section 11 forwardly thereof in alignment therewith and supported by a castering wheel 12. A depending bracket 13 is pivotally connected by a draft member 14 to a drawbar 15 of a tractor designated at 16 in FIGURE 2.

The function of an implement of this type is to level the ground by shaving off bumps and filling in depressions, and for this reason it is important that the earth scraping tool be mounted as far back from the tractive vehicle as possible so as not to be influenced thereby. Therefore, earth working apparatus is mounted on and suspended from the rear end of the main beam 10 and is designated by the numeral 17. This earth working apparatus, per se, forms no part of this invention but may be understood to include side walls 18 and a rear wall 19 extending transversely of the main frame section 10 and having secured to its lower end a transverse earth scraping blade 20.

The sides 18 of the bucket are braced in front by a cross bar 21 having affixed to its ends plates 22 to which the forward ends of the walls 18 are pivotally connected by pins 23. Braces 24 diverging downwardly, and a central brace 25, are secured to the beam 10 and cross bar 21 and additional strength is provided by a brace 26 connected to bar 21 and beam 10, and a pair of straps 27 connected to the ends of plates 22 and to plate 28 affixed to the underside of beam 10. A hydraulic ram 29 is anchored to a lug 30 affixed to the rear end of beam 10 and is connected at its other end to the rear wall 19 of the scraper bucket. The ram 29 is supplied with fluid under pressure in any suitable manner well known in the art through hose lines 31 from the tractor 16.

The main frame section 10 is generally rectangular in section and comprises laterally spaced structural members 32. Structural members 32 are generally C-shaped, with flattened side walls and upper and lower U-shaped channels 33 and 34, respectively. Members 32 are held rigidly in spaced relation by cross bars 35. Cross bar 35 has affixed thereto within the frame 10, an extended base 36 having affixed to its ends a pair of racks 37 having teeth 38 formed thereon, for a purpose hereinafter to be set forth.

The frame of the implement of this invention also includes a tail section or tail beam 39, generally rectangular in section adapted to conform to the shape of the tubular main beam 10 but of smaller dimensions to be slidably and telescopically received in the tubular frame section 10.

As shown in FIGURE 7, tail beam 39 comprises laterally spaced C-shaped channel members 40 having upper and lower U-shaped channels 41 and 42, respectively, adapted to be slidably received in the channels 33 and 34 of main beam 10. Channel sections 33 and 34 have secured to the insides slide blocks 43 and 44 engageable with slide blocks 45 and 46 secured to the outsides of channel sections 41 and 42 of the tail beam 39.

A plate 47 is affixed to the rear ends of channel members 40 of tail section 39, and to this plate is secured a yoke 48 having downwardly diverging legs 49 to which is affixed a transverse axle 50 upon the ends of which are mounted ground-engaging wheels 51 adapted to support the rear end of the implement.

In an implement of this type it is not only important that the leveling blade assembly 17 be located as far back of the tractor as possible, but that the wheels carrying the rear end of the frame also be mounted as far back of the leveling apparatus as possible during operation. The operating position of the implement of this invention is shown in FIGURES 1 and 3, and it will be readily understood that in turning an implement of this length, where the longitudinally extending frame structure is rigid vertically and laterally, the wheels 51 will scuff over the ground and make turning the tractor and implement extremely difficult. In order to secure the advantages of an implement of this type without the disadvantages inherent in such leveling machines of conventional construction, applicant has found the advantages of a rigid frame construction with well spaced ground-engaging elements can be retained if the wheels 51 are brought up closely behind the scraper assembly 17 when turning the implement as at the end of a field. The implement then follows the tractor better on turns, is better under control of the tractor operator, and the leveling blade 20 is stabilized in that it is supported by the wheels 51 in turning.

As pointed out before, channel members 40 of tail section 39 are slidably receivable in channel members 32 of the main frame 10. Affixed to each of the members 40 and extending across each of the lower channels 42 is a longitudinally extending bar 52, each of which has secured to its upper surface an elongated longitudinally extending rack 53 having teeth 54 parallel with teeth 38 in racks 37 carried by the main beam 10.

In FIGURE 6 the implement is shown in its fully extended position, that is, with the tail section 39 in its maximum operating position with the wheels 51 the maximum distance behind the leveling blade 20. It will be noted that in this position the rear end of rack 37 overlaps the forward end of rack 53 of tail section 39. The teeth 38 of each of the racks 37 in the upper part of main frame 10 mesh with a pair of gear wheels or pinions 55 having teeth 56 also meshing with teeth 54 of the lower laterally spaced racks 53 at the bottom of channel members 40 of the tail section 39.

It will be readily understood from a study of FIGURES 5 and 6, that by shifting the gear wheels 55 by rotation thereof the length of the upper racks 37 in main beam 10, the tail beam 39 is telescoped in the main beam at twice the rate of movement of the wheel 55 lengthwise of rack 37, because the wheel 55 in moving from one end of rack 37 to the other also shifts rack 53 and therefore tail beam 39 substantially twice the length of rack 37 to the position of FIGURE 5 where the forward end of rack 37 overlaps the rear end of rack 53. In FIGURE 5 the tail beam 39 is in its fully retracted position.

Shifting of the pinion 55 from one end of rack 37 to the other is accomplished by power transmitting means in the form of a hydraulic ram 57 comprising a cylinder 58 provided at its end with an apertured lug 59 mounted upon a pivoted pin 60 carried by a pair of cup-shaped brackets 61 affixed to two channel members 32. Fluid under pressure is supplied to the cylinder 58 through hose lines 62 from the tractor or other vehicle by which the implement is propelled to extend and retract the piston rod 62 in the cylinder. The end of rod 62 terminates in an apertured lug 63 mounted on a pivot pin 64 carried by a pair of vertically spaced plates 65 spaced by laterally spaced blocks 66 and joined by a plurality of bolts 67. The outer ends of blocks 66 are reduced to form stub axles 68 rotatably received in bearings 69 carried by the pinions 55. Extension and retraction of piston rod 62 in cylinder 58 thus shifts the gear wheels 55 lengthwise of racks 37, simultaneously causing the wheels 55 meshing with the teeth of rack 37 to shift racks 53 and tail section 39 twice the longitudinal distance covered by the piston stroke. It may be understood that, if desired, the piston rod 62 may be extended or retracted less than its full stroke and the tail section 39 held at some position between fully extended and fully contracted position. This is accomplished by locking the fluid in the cylinder by any suitable fluid supply means well known in the art and forming no part of this invention.

When the tractor operator is ready to turn the implement at the end of a field while it is in operation, he merely actuates ram 57, which telescopes the frame of the machine from the position shown in FIGURE 1 to that of FIGURE 2, so that the blade is fully supported throughout the turn. When the implement is to be transported, ram 29 is also actuated.

In FIGURES 9 to 14 a modified form of support is provided for the front end of the implement. A wheeled truck 70 is provided, the forward end of which is adapted for connection to the tractor drawbar 15. Wheeled hitching truck 70 includes a longitudinally extending horizontal frame 71 comprising laterally spaced angle bars 72 connected medially of the ends thereof by a cross-brace 73. The forward ends of bars 72 converge and are secured to a clevis 74 connected by a vertical pivot pin 75 to the tractor drawbar. Transverse bars 76 are secured to and extend laterally from the rear end of frame 71 and are connected by an arch 77 forming with uprights 78 a vertical slot or guide-way in which is received the forward end of the hitch portion 11 of the main frame section 10.

The forward end of hitch section 11 has affixed thereto and projecting forwardly therefrom a lip 79 and a pair of side plates 80. Lip 79 is apertured to rotatably receive a crank 81, the lower end of which is threaded for reception in a threaded opening provided in a swivel 82, trunnion-mounted in the side plates 80 and carried between the rear ends of a pair of links 83 which are also provided, medially of their ends, with a transverse pivot pin 84 upon which is mounted a sleeve 85 extending between the links 83. The forward ends of links 83 are mounted upon another pivot pin 86 carried by a bracket 87 affixed to the cross-brace 73.

A bearing 88 is affixed to the outer end of each bar 76 to rotatably receive the upper end of the spindle 89, the lower end of which carries a castering ground-engaging supporting wheel 90.

By operation of crank 81 to pivot links 83 about the pin 84, the attitude or angle of the entire implement frame relative to the truck 70 can be varied. Likewise, suitable adjustments can be made in this manner when the hitching truck 70 is to be attached to a tractor having a higher or lower drawbar.

The entire implement frame including main section 10 and tail section 39 is capable of pivoting about the axis of pin 86 relative to the wheeled hitching truck 70 in response to changes in ground contour. Such vertical swinging or adjustment of the frame relative to the truck is accommodated within the confines of arch 77, pads 91 being secured to the sides of the forward portion of the main section 10 to engage uprights 78 and limit relative lateral movement. The forward end of truck 70 also carries a transverse pivot pin 92 upon which clevis 74 is mounted to accommodate vertical pivoting of the truck relative to the tractor.

When it is desired to use the implement of this invention as a scraper to move a quantity of dirt into a low spot and to "feather out" the dirt, the operator adjusts the bucket carrying scraper blade 20 to the position desired by actuation of hydraulic cylinder 29. He then actuates crank 81 and adjusts the forward end of the main frame section 10 relative to links 83 and hitching truck 70 to tilt the entire frame forwardly and downwardly from the horizontal position shown in FIGURE 9 to the tilted position of FIGURE 10 with the hitch point of the implement lowered with respect to the truck 70. In this position, telescoping of the tail section 39 into the main section 10 of the implement frame causes the scraper blade 20 to gradually rise as ground engaging tail wheels 51 approach the scraper blade, and causes the dirt to be spread evenly over the low spots.

It should be clear that in the "feathering out" operation, no trial and error operation of the scraper blade on the part of the tractor operator is necessary; nor is it necessary to actuate the hydraulic cylinder 29 to raise the bucket during the feathering operation. This may be reserved for transport purposes.

The advantages inherent in applicant's apparatus in performing a feathering operation should be clearly understood if it is assumed, for example, that the wheeled truck 70 is not adjustable with respect to frame 10, providing a fixed hitch point and disposition of the implement frame relative to the ground. Feathering then requires that the bucket with its earthworking blade 20 be gradually raised as the ground to be feathered is traversed. To do this the operator must nudge the bucket lifting cylinder 29 in small increments, because if he were to actuate the cylinder for its full stroke it would merely perform its function of lifting the bucket quickly so that no feathering would be possible with respect to any dirt engaged by blade 20. How often and for how long a period the cylinder 29 must be actuated to cause the bucket to rise gradually over the strip to be feathered depends upon the length of that strip, so that it would be a rare occasion when an operator could successfully feather an area without at least two passes over the area to establish the rate at which the bucket must be lifted.

However, with applicant's apparatus, the cylinder 29 is not actuated to raise the bucket relative to the frame. Rather the position of the bucket relative to the frame remains fixed. The operator angularly adjusts the main frame 10 relative to truck 70 and to the ground and actuates cylinder 58 to telescope the frame and bring wheels 51 closer to the bucket. Due to the angle of the implement frame relative to the truck 70 and the fact that the rear end of main section 10 is lower than the rear end of tail section 39, the section carrying the bucket is gradually lifted throughout the telescoping movement of the tail section.

In the regular planing operations, of course, it is desired that the cutting blade remain at the same operating depth for a particular operation; however, since the implement frame must be level for this purpose and, inasmuch as tilting of the frame occurs when the implement is attached to a tractor having a different drawbar height, adjustment of the front end of the frame with respect to the wheeled truck 70 is made to compensate for the change in tractor drawbar height and level the frame.

It is believed that the construction and operation of the improved land leveling and scraping machine of this invention will be clearly understood from the foregoing description. It should likewise be understood that the invention has been described in its preferred embodiment, and that modifications may be made in the invention without departing from the spirit thereof or the scope of the appended claims.

What is claimed is:

1. A land leveling machine comprising an elongated main beam having hitch means at the forward end thereof for connection to a propelling vehicle, a leveling blade mounted on said main beam, a tail beam conforming generally to the shape of the main beam and having sliding telescopic cooperation therewith to form a rigid supporting frame for the blade, supporting wheels mounted on the rear end of said tail beam to support the latter and the rear portion of the main beam, said tail beam being slidable relative to the main beam from an operating position of the machine with said wheels a substantial distance rearwardly of said leveling blade to a ground-engaging transport position with said wheels adjacent and supporting the blade, and force transmitting means mounted on one of said beams and operatively connected to the other said beam for telescoping said beams.

2. A land leveling machine comprising an elongated main beam having hitch means at its forward end for connection to a propelling vehicle, a transverse leveling blade mounted on said main beam, first gear means carried by the main beam, a tail beam conforming generally to the shape of the main beam and arranged in sliding telescopic association therewith to form a rigid supporting frame for the blade, supporting wheels mounted on the rear end of said tail beam to support the latter and the main beam, second gear means carried by the tail beam and arranged in cooperative relation with said first gear means to slidably move said tail beam, upon actuation of said gear means, from an extended position with said wheels a substantial distance rearwardly of the leveling blade to a ground-engaging closed position with said wheels closely adjacent and supporting the leveling blade, and means for actuating said gear means.

3. A land leveling machine comprising an elongated generally tubular main beam having hitch means at its forward end for connection to a propelling vehicle, a transverse leveling blade mounted on said main beam, a tail beam having ground-engaging means thereon for supporting the tail beam and the main beam and slidably connected to the main beam for relative telescopic movement from a position with said ground-engaging means spaced a substantial distance rearwardly of said leveling blade to a position with said ground-engaging means in ground-engaging supporting position in close proximity to said leveling blade to form a rigid supporting frame therefor, said beams being relatively rigid laterally and vertically throughout the range of telescopic movement thereof, and force transmitting means mounted on one of said beams and operatively connected to the other said beam for sliding one of said beams relative to the other.

4. A land leveling machine comprising an elongated generally tubular main beam having hitch means at its forward end for connection to a propelling vehicle, a transverse leveling blade mounted on the rear portion of said main beam, a tail beam having ground-engaging means thereon and slidably connected to the main beam for relative telescopic movement from a position with said ground-engaging means spaced a substantial distance rearwardly of said leveling blade to a position with said ground-engaging means engaging the ground in close proximity to and supporting said leveling blade, said beams being relatively rigid laterally and vertically throughout the range of telescopic movement thereof, power operated means mounted on the main beam and operatively connected to said tail beam for sliding the latter relative to the main beam, said power operated means including a hydraulic cylinder anchored to the main beam having a piston rod slidable therein, opposed stationary gear teeth mounted on the main beam and the tail beam lengthwise thereof, and a rotatable gear wheel carried by the piston rod cooperable with said gear teeth to telescope said tail beam relative to said main beam upon actuation of said piston rod.

5. A land leveling machine of the type having a laterally and vertically rigid frame, comprising an elongated tubular main beam generally rectangular in section adapted for connection at its forward end to a tractive vehicle, a leveling blade mounted on said main beam, an elongated tail beam having supporting wheels on the rear end thereof adapted to be telescopically associated with said main beam to support the latter and said blade and slidable relative thereto from a fully open operating position with said wheels spaced a substantial distance rearwardly of said leveling blade to a closed position with said wheels engaging the ground proximate said blade, a hydraulic ram anchored at one end to the main beam, and means operatively connecting the other end of the ram to the tail beam for extending and retracting the latter relative thereto the main beam upon actuation of the ram.

6. A land leveling machine of the type having a laterally and vertically rigid frame, comprising an elongated tubular main beam generally rectangular in section adapted for connection at its forward end to a tractive vehicle, a leveling blade mounted on said main beam, an elongated tail beam having supporting wheels on the rear end thereof adapted to be telescopically received in said main beam to support the latter and said blade and slidable therein from a fully open operating position with said wheels spaced a substantial distance rearwardly of said leveling blade to a closed position with said wheels engaging the ground proximate said blade, an elongated first toothed rack secured to the main beam, a rotatable toothed gear wheel carried by the main beam arranged to mesh with said first rack, power transmitting means mounted on the main beam and operatively connected to said gear wheel to shift the latter lengthwise of said first rack, and a second elongated toothed rack secured to the tail beam, said gear wheel being arranged to simultaneously mesh with said second toothed rack to move the latter and the tail beam in response to said shifting of said gear wheel.

7. The invention set forth in claim 6, wherein said power transmitting means is a hydraulic ram anchored at one end to the main beam and at the other end to said gear wheel.

8. A land leveling machine of the type having a laterally and vertically rigid frame, comprising an elongated tubular main beam generally rectangular in section adapted for connection at its forward end to a tractive vehicle, a leveling blade mounted on said main beam, an elongated tail beam having supporting wheels on the rear end thereof adapted to be telescopically received in said main beam to form therewith a rigid supporting frame for the blade and slidable therein from a fully open operating position with said wheels spaced a substantial distance rearwardly of said leveling blade to a closed position with said wheels engaging the ground proximate said blade, a hydraulic ram anchored at one end to the main beam, and means operatively connecting the other end of the ram to the tail beam for shifting the latter in the main beam in response to the extension and retraction strokes of the ram, including means effective to shift the tail beam at a faster rate and for a greater distance than the stroke of the ram.

9. The invention set forth in claim 5, wherein opposing walls of said tubular main beam are in the form of channel members and corresponding walls of said tail beam are in the form of chanel members receivable in the channel members of the main beam to guide the tail beam during telescoping and hold it substantially against lateral and vertical movement relative to the main beam.

10. In an earthworking machine, a longitudinally elongated frame comprising a main frame section carrying an earth scraping blade and having hitch means at its forward end for connection to a tractive vehicle and a tail section having ground-engaging means disposed thereon a substantial distance rearwardly of said blade and forming with the main section a unitary rigid supporting frame supported only at its front and rear ends adapted to maintain said blade at a substantially constant height relative to the ground to remove elevations and fill depressions therein while the machine is being propelled over the ground by said tractive vehicle, means forming a telescopic association between said main and tail sections, power-transmitting means operatively connected between said main and tail sections for sliding said tail section relative to said main section to a closed position with said ground-engaging means closely adjacent said scraping blade while holding said sections against relative vertical movement throughout the range of relative sliding movement thereof, and means in said hitch means for adjusting the vertical position of the forward end of the supporting frame to tilt the latter in a vertical plane to accommodate a gradual vertical movement of said main blade carrying section as the ground-engaging means on said tail section approaches said blade.

11. In an earthworking machine, a longitudinally elongated frame comprising a main frame section carrying an earth scraping blade and having hitch means at its forward end for connection to a tractive vehicle and a tail section having ground-engaging means disposed thereon a substantial distance rearwardly of said blade and forming with the main section a unitary rigid supporting frame supported only at its front and rear ends adapted to maintain said blade at a substantially constant height relative to the ground to remove elevations and fill depressions therein while the machine is being propelled over the ground by said tractive vehicle, means forming a telescopic association between said main and tail sections, power-transmitting means operatively connected between said main and tail sections for sliding said tail section relative to said main section to a closed position with said ground-engaging means engaging the ground closely adjacent said scraping blade, and means in the hitch means for lowering the forward end of said unitary supporting frame and tilting the latter forwardly and downwardly, whereby the vertical position of the blade relative to the ground is gradually increased upon movement of said tail section to its closed position relative to the main section while the machine is being propelled over the ground.

12. The invention set forth in claim 10, wherein said hitch means includes a ground-engaging member connected to the tractor in draft-receiving relation and connected to the forward end of the main section for pivoting on a transverse axis.

13. The invention set forth in claim 12, wherein said ground-engaging member is a wheeled truck to which the forward end of the main frame section is pivotally connected on a transverse axis.

14. The invention set forth in claim 10, wherein said main frame section is tubular in construction and the tail section conforms to the shape of the main section and is slidably received therein.

15. The invention set forth in claim 14, wherein said power-transmitting means is a hydraulic cylinder mounted in the main section and operatively connected to the tail section to telescope the latter from an extended position to a closed position within the main section.

16. An earthworking machine, comprising a tubular main frame section carrying an earth scraper blade at its rear end, a tail frame section having ground-engaging means supporting its rear end and having its forward end slidably associated with said main frame section to form therewith a unitary rigid supporting frame parallel to the ground, power-transmitting means operatively connecting said main and tail sections for sliding the tail section relative thereto to a closed position while maintaining engagement of said ground-engaging means with the ground, a wheeled truck supporting the forward end of said main frame section, and means carried by the truck and operatively engageable with the main section to adjust the height of the forward end thereof relative to the ground to tilt said main section, whereby the blade-carrying rear end of said main section is gradually moved vertically during sliding of said tail section to its closed position.

17. An earthworking machine, comprising a tubular main frame section carrying an earth scraper blade at its rear end, a tail frame section having ground-engaging means supporting its rear end and having its forward end slidably associated with said main frame section to form therewith a unitary rigid supporting frame parallel to the ground power-transmitting means operatively connecting said main and tail sections for sliding the tail section relative thereto to a closed position while maintaining engagement of said ground-engaging means with the ground, a wheeled truck supporting the forward end of said main frame section including a truck frame having its forward end adapted for connection to a tractive vehicle, laterally spaced wheels on the rear end of the truck frame, means pivotally connecting the forward end of said main section to the truck frame medially of its ends, and means in the connection of the main section to the truck for adjusting the height of the front end of the main section relative to the ground to tilt said main section, whereby the blade-carrying rear end of said main section is gradually moved vertically during sliding of said tail section to its closed position.

18. The invention set forth in claim 17, wherein guide means is provided on the wheeled truck to laterally confine the forward end of said main frame section while accommodating pivoting thereof relative to the wheeled truck.

19. In an earthworking machine, a frame comprising a main section having ground-engaging means supporting the forward end thereof and carrying a scraper blade near its rear end, a tail section having ground-engaging means supporting its rear end and telescopically associated with the main frame to form therewith a unitary rigid supporting frame parallel to the ground, power-transmitting means operatively connecting said main and tail sections for telescoping the tail section relative to the main section from an extended to a closed position supporting the rear end of said main section, and means for vertically adjusting the forward end of the main frame relative to the said ground-engaging means therefor to tilt said supporting frame in a vertical plane about said tail section ground-engaging means as an axis whereby the blade-carrying rear portion of said main section is progressively moved vertically during telescoping of said tail section to its closed position.

References Cited by the Examiner

UNITED STATES PATENTS

| Re. 23,895 | 11/1954 | Winget | 37—2 |
| 2,464,227 | 3/1949 | Gurries et al. | 37—180 |
| 2,719,369 | 10/1955 | Lindbeck | 37—169 |
| 2,766,630 | 10/1956 | Ehrler | 74—110 |
| 2,842,874 | 7/1958 | Shumaker | 37—169 X |
| 2,842,972 | 7/1958 | Houdart | 74—91 |
| 2,870,555 | 1/1959 | Gurries et al. | 37—180 |
| 3,033,524 | 5/1962 | Le Tourneau | 37—2 |
| 3,036,392 | 5/1962 | Marvin. | |

FOREIGN PATENTS

| 630,809 | 6/1936 | Germany. |
| 127,493 | 10/1959 | Russia. |

OTHER REFERENCES

Operator's Manual OM-K 36403K for the John Deere 930 and 940 Planes. Published by the John Deere Tractor Co., Moline, Illinois, page 2.

ABRAHAM G. STONE, *Primary Examiner.*

ROBERT C. RIORDON, ARNOLD RUEGG,
T. GRAHAM CRAVER, ANTONIO F. GUIDA,
*Examiners.*

J. O. BOLT, *Assistant Examiner.*